(12) United States Patent
Kim et al.

(10) Patent No.: US 12,617,279 B2
(45) Date of Patent: May 5, 2026

(54) AUTO-ADJUSTING DIGITAL CLUSTER UTILIZING MACHINE LEARNING DATABASE

(71) Applicant: GM GLOBAL TECHNOLOGY OPERATIONS LLC, Detroit, MI (US)

(72) Inventors: Hyejin Kim, Seoul (KR); Donggyun Kim, Seo-gu (KR); Sangyoon Keum, Paju-si (KR); Russell A Patenaude, Macomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/829,169

(22) Filed: Sep. 9, 2024

(65) Prior Publication Data

US 2026/0070412 A1     Mar. 12, 2026

(51) Int. Cl.
    B60K 35/22       (2024.01)
    G06V 20/59       (2022.01)

(52) U.S. Cl.
    CPC .............. B60K 35/22 (2024.01); G06V 20/59 (2022.01)

(58) Field of Classification Search
None
See application file for complete search history.

(56) References Cited

U.S. PATENT DOCUMENTS

| | | | |
|---|---|---|---|
| 2015/0084764 A1* | 3/2015 | Wunsche | B60K 35/652 |
| | | | 340/462 |
| 2017/0291493 A1* | 10/2017 | Bostick | B60K 35/25 |
| 2018/0194228 A1* | 7/2018 | Dziurda | G06T 11/00 |
| 2021/0174767 A1* | 6/2021 | Edgren | G09G 3/002 |
| 2021/0406565 A1* | 12/2021 | Heimrath | G09G 5/14 |
| 2024/0036642 A1* | 2/2024 | Wood | G06F 3/013 |

FOREIGN PATENT DOCUMENTS

| | | |
|---|---|---|
| DE | 102014113308 A1 | 3/2015 |
| DE | 102018128706 A1 | 5/2020 |

* cited by examiner

*Primary Examiner* — Rachid Bendidi
*Assistant Examiner* — Nada Mahyoob Alqaderi
(74) *Attorney, Agent, or Firm* — Ingrassia Fisher & Lorenz, LLP | IF&L

(57)       ABSTRACT

In accordance with exemplary embodiments, methods and systems are provided that include obtaining, via one or more sensors of a vehicle, sensor data pertaining to a steering wheel of the vehicle; determining, via a processor of the vehicle using the sensor data, whether a view of a display of the vehicle by a user of the vehicle is obstructed by the steering wheel; and adjusting, via instructions provided by the processor, one or more display images presented on the display, when it is determined that the view of the display by the user of the vehicle is obstructed by the steering wheel.

18 Claims, 7 Drawing Sheets

AUTO-ADJUSTING DIGITAL CLUSTER UTILIZING MACHINE LEARNING DATABASE

INTRODUCTION

The technical field generally relates to vehicles and, more specifically, to methods and systems for adjusting displays of vehicles for optimal viewing by a user of the vehicle.

Many vehicles today include a display for viewing by a driver or other user of the vehicle, for example including a speed of the speed and/or other parameters relating to the vehicle and/or operation thereof. However, such existing vehicle systems may not always provide optimal viewing of the display by the user, for example when the user's view of one or more parameters of the display may be blocked.

Accordingly, it is desirable to provide improved methods and systems for adjusting displays of vehicles, including for improved viewing by a user of the vehicle. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes obtaining, via one or more sensors of a vehicle, sensor data pertaining to a steering wheel of the vehicle; determining, via a processor of the vehicle using the sensor data, whether a view of a display of the vehicle by a user of the vehicle is obstructed by the steering wheel; and adjusting, via instructions provided by the processor, one or more display images presented on the display, when it is determined that the view of the display by the user of the vehicle is obstructed by the steering wheel.

Also in an exemplary embodiment, the obtaining of the sensor data includes obtaining camera images via one or more cameras of a driver monitoring system of the vehicle; the determining of whether the view of the display is obstructed is made by the processor based on the camera images; and the adjusting of the one or more display images is performed via the processor using a machine language model.

Also in an exemplary embodiment, the camera images pertain to both the steering wheel and the user of the vehicle, in addition to a reference point that is used for determining whether the view of the display by the user is obstructed by the steering wheel; and the determining of whether the view of the display is obstructed is made by the processor based on the camera images of the steering wheel, the user, and the reference point.

Also in an exemplary embodiment, the reference point includes a center of an airbag cover on a B-pillar inside a cabin of the vehicle.

Also in an exemplary embodiment, the step of determining whether the view of the display is obstructed further is performed by the processor using a three dimensional coordinate representation of the camera images representing a head of a driver of the vehicle that is utilized for an estimation of a line of sight between eyes of the driver and the display in combination with an estimated position of the steering wheel.

Also in an exemplary embodiment, the step of obtaining the sensor data further includes obtaining steering wheel position sensor data from one or more steering wheel position sensors of the vehicle; and the determining of whether the view of the display is obstructed is made by the processor based on the steering wheel position sensor data in addition to the camera images.

Also in an exemplary embodiment, the step of adjusting the one or more display images includes shifting, via the processor, the one or more display images to a different portion of the display that is not obstructed for the user by the steering wheel.

Also in an exemplary embodiment, the step of adjusting the one or more display images includes re-scaling, via the processor, the one or more display images to a different size so that the one or more display images are no longer obstructed for the user by the steering wheel.

Also in an exemplary embodiment, a magnitude of the re-scaling is based on whether the one or more display images represent a regulatory requirement; and a portion of the one or more display images is conditionally hidden on the display based on whether the re-scaling was successful in alleviating obstruction by the steering wheel and further based on whether the one or more display images represent a regulatory requirement.

Also in an exemplary embodiment, the machine language model includes a plurality of input layers with values from the sensor data and from a machine language database, including driver eye position, steering wheel position, and reference position, along with shifting and centralizing, re-scaling, and conditionally hidden options; a plurality of hidden layers for processing the plurality of input layers; and an output node that is generated from the plurality of hidden layers using each of the plurality of input layers, including the driver eye position, the steering wheel position, and the reference position, along with the shifting and centralizing, re-scaling, and conditionally hidden options.

In another exemplary embodiment, a system is provided that includes one or more sensors of a vehicle and a processor. The one or more sensors are configured to obtain sensor data pertaining to a steering wheel of the vehicle. The processor is coupled to the one or more sensors and is configured to at least facilitate determining, using the sensor data, whether a view of a display of the vehicle by a user of the vehicle is obstructed by the steering wheel; and adjusting, via instructions provided by the processor, one or more display images presented on the display, when it is determined that the view of the display by the user of the vehicle is obstructed by the steering wheel.

Also in an exemplary embodiment, the one or more sensors include one or more cameras that are configured to obtain camera images; and the processor is further configured to at least facilitate determining whether the view of the display is obstructed based on the camera images; and adjusting the one or more display images using a machine language model.

Also in an exemplary embodiment, the camera images pertain to both the steering wheel and the user of the vehicle, in addition to a reference point that is used for determining whether the view of the display by the user is obstructed by the steering wheel; and the processor is further configured to at least facilitate determining whether the view of the display is obstructed based on the camera images of the steering wheel, the user, and the reference point.

Also in an exemplary embodiment, the processor is further configured to at least facilitate determining whether the view of the display is obstructed using a three dimensional coordinate representation of the camera images representing a head of a driver of the vehicle that is utilized for an estimation of a line of sight between eyes of the driver and the display in combination with an estimated position of the steering wheel.

Also in an exemplary embodiment, the one or more sensors further include one or more steering wheel position sensors of the vehicle that are configured to obtain steering wheel position sensor data; and the processor is further configured to at least facilitate determining whether the view of the display is obstructed using the steering wheel position sensor data in addition to the camera images.

Also in an exemplary embodiment, the processor is further configured to at least facilitate adjusting the one or more display images by shifting the one or more display images to a different portion of the display that is not obstructed for the user by the steering wheel.

Also in an exemplary embodiment, the processor is further configured to at least facilitate adjusting the one or more display images by re-scaling the one or more display images to a different size so that the one or more display images are no longer obstructed for the user by the steering wheel.

Also in an exemplary embodiment, a magnitude of the re-scaling is based on whether the one or more display images represent a regulatory requirement; and a portion of the one or more display images is conditionally hidden on the display based on whether the re-scaling was successful in alleviating obstruction by the steering wheel and further based on whether the one or more display images represent a regulatory requirement.

Also in an exemplary embodiment, the machine language model includes a plurality of input layers with values from the sensor data and from a machine language database, including driver eye position, steering wheel position, and reference position, along with shifting and centralizing, re-scaling, and conditionally hidden options; a plurality of hidden layers for processing the plurality of input layers; and an output node that is generated from the plurality of hidden layers using each of the plurality of input layers, including the driver eye position, the steering wheel position, and the reference position, along with the shifting and centralizing, re-scaling, and conditionally hidden options.

In another exemplary embodiment, a vehicle is provided that includes a body, a drive system configured to move the body, a steering wheel, a display, one or more sensors, and a processor. The one or more sensors are configured to obtain sensor data pertaining to the steering wheel. The processor is coupled to the one or more sensors and is configured to at least facilitate determining, using the sensor data, whether a view of the display by a user of the vehicle is obstructed by the steering wheel; and adjusting, via instructions provided by the processor, one or more display images presented on the display, when it is determined that the view of the display by the user of the vehicle is obstructed by the steering wheel.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
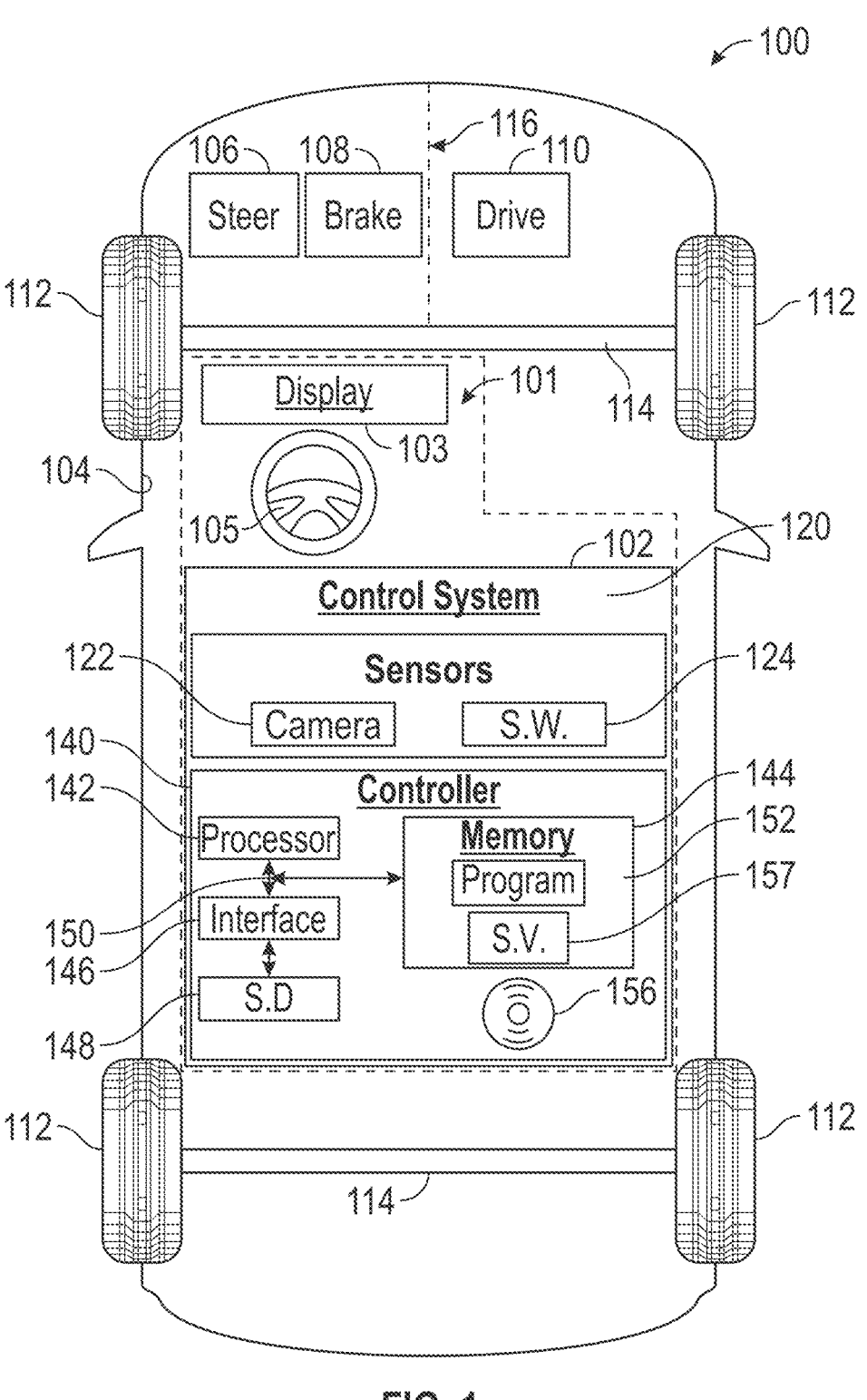
FIG. 1 is a functional block diagram of a vehicle that includes a display, a steering wheel, and a control system for controlling the display, including when a user's view of the display would otherwise be affected by the steering wheel, in accordance with exemplary embodiments.

FIG. 1 illustrates a vehicle 100, according to an exemplary embodiment. As described in greater detail further below, the vehicle 100 includes a display 103 and a control system 102 that is configured for controlling the display 103, including when a user's view of the display 103 would otherwise be impaired, in accordance with exemplary embodiments.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

The vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. In certain embodiments, the drive system 110 comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used.

As depicted in FIG. 1, the vehicle also includes a braking system 106 and a steering system 108 in various embodiments. In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering column coupled to the axles 114 and/or the wheels 112) that are controlled via inputs provided by a driver (e.g., via the steering wheel 105 in certain embodiments) and/or automatically via the control system 102.

In various embodiments, the display 103 provides information for a driver and/or other user of the vehicle 100. For example, in various embodiments, the display 103 provides a digital cluster of display images that feature parameters and information as to a speed of the vehicle 100, among other possible parameters relating to the vehicle 100 and/or the operation thereof (e.g., revolutions per minute, temperature, fuel gauge, and so on). In various embodiments, the display 103 comprises a system that includes a display screen for visual depiction of this information for the user, in accordance with instructions provided thereto by the control system 102. In certain embodiments, the display 103 may also include one or more audio, haptic, and/or other components.

In the embodiment depicted in FIG. 1, the control system 102 is coupled to the display 103. In certain embodiments, the control system 102 may also be coupled to one or more other vehicle components, such as the drive system 110, steering system 108, braking system 106, and so on. In various embodiments, the control system 102 controls the display 103, including by adjusting images and parameters for the display 103 when a user's view of the display 103 is impaired or instructed, including when the steering wheel 105 obstructs a portion or more of the user's view of the display 103. In various embodiments, the control system 102 provides these functions in accordance with the process 200 of FIG. 2 and the implementations of FIGS. 3-5, 6A, 6B, 7A, 7B, and 8, and as described in greater detail further below in connection therewith. In certain embodiments, the control system 102 may also control one or more other systems of the vehicle 100.

As depicted in FIG. 1, in various embodiments, the control system 102 includes a sensor array 120 and a controller 140, as described in greater detail below.

In various embodiments, the sensor array 120 includes various sensors that obtain sensor data for use in determining whether a user's view of the display 130 is obstructed. In the depicted embodiment, the sensor array 120 includes one or more cameras 122 and one or more steering wheel sensors 124.

In various embodiments, the one or more cameras 122 obtain camera images pertaining to a face of a driver of other user of the vehicle 100, and in further embodiments also pertaining to the steering wheel 105 as well as one or more reference points of the vehicle 100, including for use in determining whether the user can directly view the display 130 without obstruction.

In addition, in various embodiments, the one or more steering wheel position sensors 124 detect a position of the steering wheel 105 of the vehicle 100, in the form of steering wheel position sensor that may also be used in determining whether the user can directly view the display 130 without obstruction.

In various embodiments, the controller 140 is coupled to the sensor array 120 and to the display 103. In various embodiments, the controller 140 may also be coupled to one or more other vehicle systems, as noted above. Also in various embodiments, the controller 140 comprises a computer system (also referred to herein as computer system 140), and includes a processor 142, a memory 144, an interface 146, a storage device 148, and a computer bus 150.

In various embodiments, the controller (or computer system) 140 controls the display 103, including adjustments thereto, such that the driver or other user of the vehicle 100 can view the parameters and information of the display 103 without obstruction (including without obstruction by the steering wheel 105). In various embodiments, the controller 140 provides these and other functions in accordance with the steps of the process 200 of FIG. 2 and the implementations of FIGS. 3-5, 6A, 6B, 7A, 7B, and 8.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIG. 2 and the implementations of FIGS. 3-5, 6A, 6B, 7A, 7B, and 8.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with stored values 157 (e.g., threshold values for the process 200 in various embodiments).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 discussed further below in connection with FIG. 2 and the implementations of FIGS. 3-5, 6A, 6B, 7A, 7B, and 8. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

With continued reference to FIG. 1, in certain embodiments the control system 102 may also be construed as being a part of a larger system 101, for example that also includes the display 103 and/or steering wheel 105 in certain embodiments.

Figure 2:
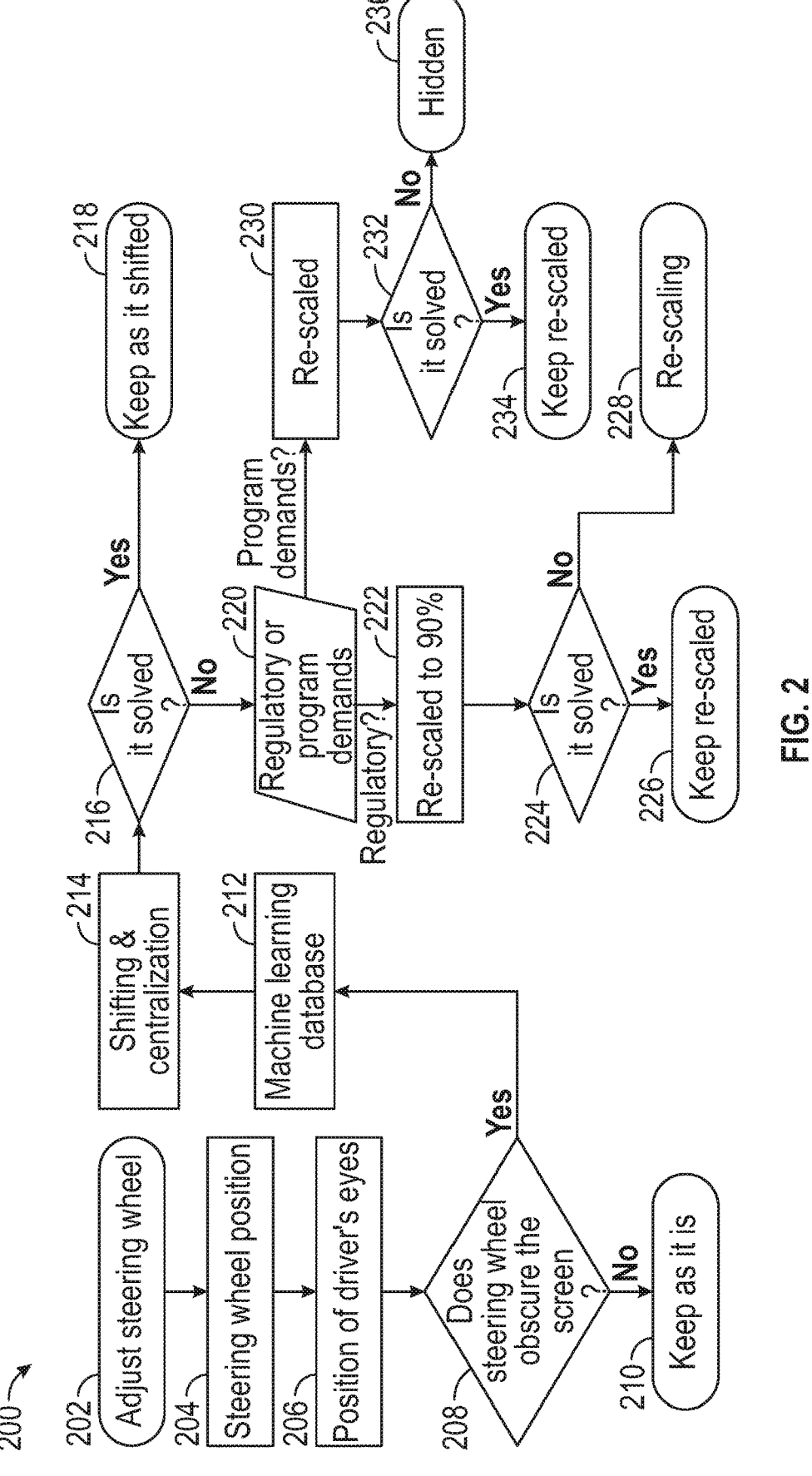
FIG. 2 is a flowchart of a process for controlling a vehicle display, including when a user's view of the display would otherwise be affected by the steering wheel, and that can be implemented in connection with the vehicle, display, and control system of FIG. 1, in accordance with exemplary embodiments.

FIG. 2 is a flowchart of a process 200 for controlling a display of a vehicle, including when a user's view of the display would otherwise be impaired, in accordance with an exemplary embodiment. In various embodiments, the process 200 can be implemented in connection with the vehicle 100 of FIG. 1, including the display 103 and control system 102 of FIG. 1, and components thereof. The process 200 will also be discussed further below with additional reference to FIGS. 3-5, 6A, 6B, 7A, 7B, and 8, which depict exemplary implementations of the process 200 of FIG. 2.

As depicted in FIG. 2, in various embodiments, the process 200 begins at step 202. In one embodiment, the process 200 begins when a vehicle drive or ignition cycle begins, for example when a driver enters the vehicle for operation of the vehicle. In one embodiment, the steps of the process 200 are performed continuously during operation of the vehicle.

In various embodiments, sensor data is collected as a user (e.g., driver) adjusts his or her position in the vehicle 100 (step 202). In various embodiments, sensor data is obtained from the sensor array 120 of FIG. 1 as the driver adjusts his or her seat along with the steering wheel 105 of FIG. 1 prior to the current vehicle drive.

In various embodiments, steering wheel position is determined (step 204). Specifically, in various embodiments, the processor 142 determines a position of the steering wheel 105 based on the sensor data of step 202, including sensor data obtained from one or more cameras 122 and/or steering wheel sensors 124 thereof.

Figure 3:
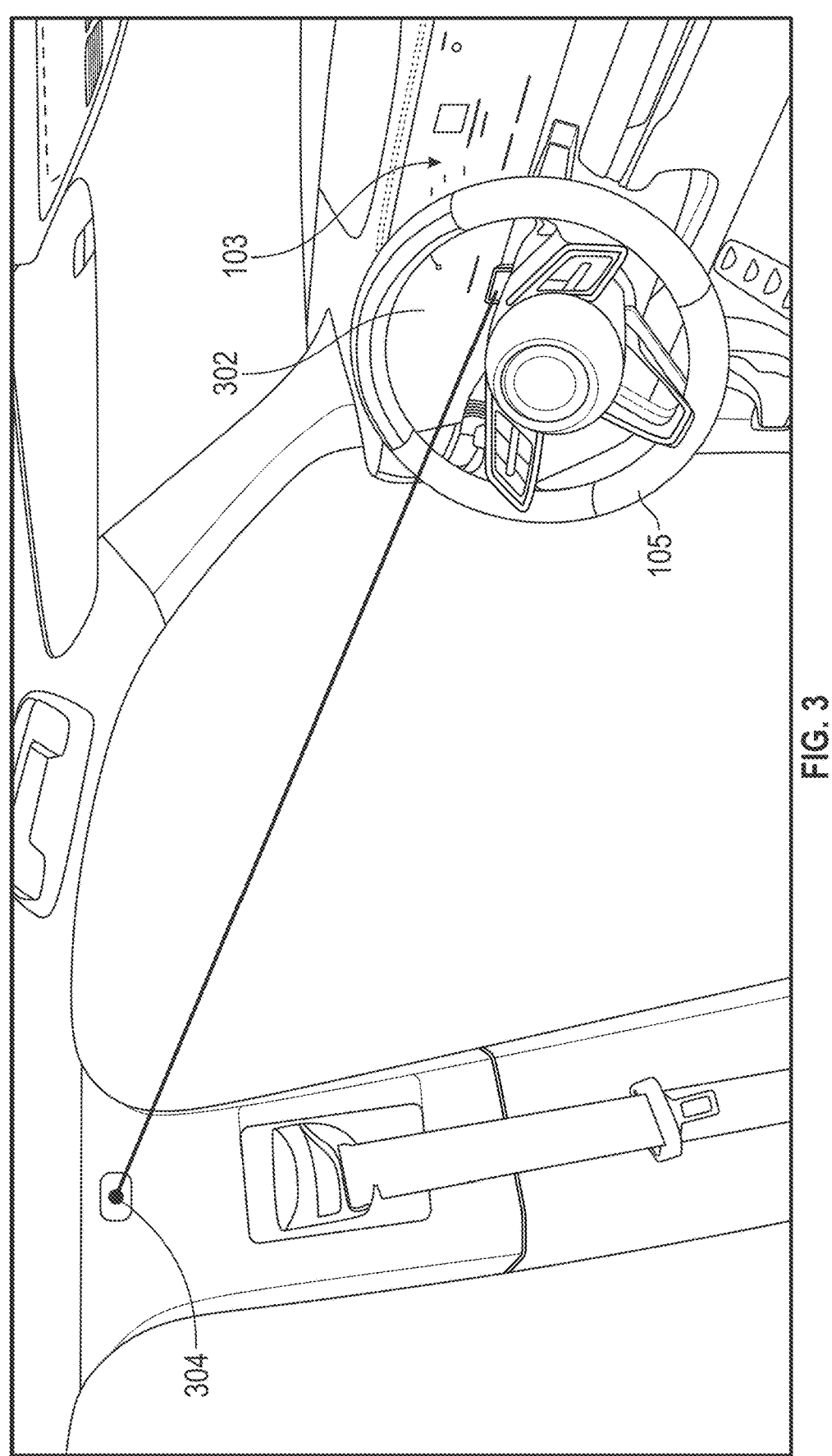
FIGS. 3 and 4 are illustrations of an exemplary implementation of a portion of the process of FIG. 2, including the determining of whether a user's view of the display is affected by the steering wheel, in accordance with exemplary embodiments.

With reference to FIG. 3, an illustration 300 is provided with respect to the determination of the steering wheel position of step 204 in accordance with an exemplary embodiment. Specifically, as depicted in the illustration 300 of FIG. 3, in an exemplary embodiment one or more cameras of a driver monitoring system (DMS) 302 (e.g., disposed proximate the steering wheel 105 in an exemplary embodiment) are utilized to detect a current location of the steering wheel 105 with respect to a known reference point 304. In an exemplary embodiment, the reference point 304 comprises a center of an airbag cover on a pillar (such as a B-pillar) of the cabin inside the vehicle 100; however, this may vary in other embodiments. In certain other embodiments, the steering wheel position may instead be determined directly via sensor data obtained via one or more steering wheel sensors 124 (which may also be part of the DMS 302 in certain embodiments).

With reference back to FIG. 2, also in various embodiments, a position of the driver is determined (step 206). Specifically, in various embodiments, the processor 142 determines a position of the eyes (and/or in certain embodiments a position of the head) of the driver based on the sensor data of step 202, including sensor data obtained from one or more cameras 122.

Figure 4:
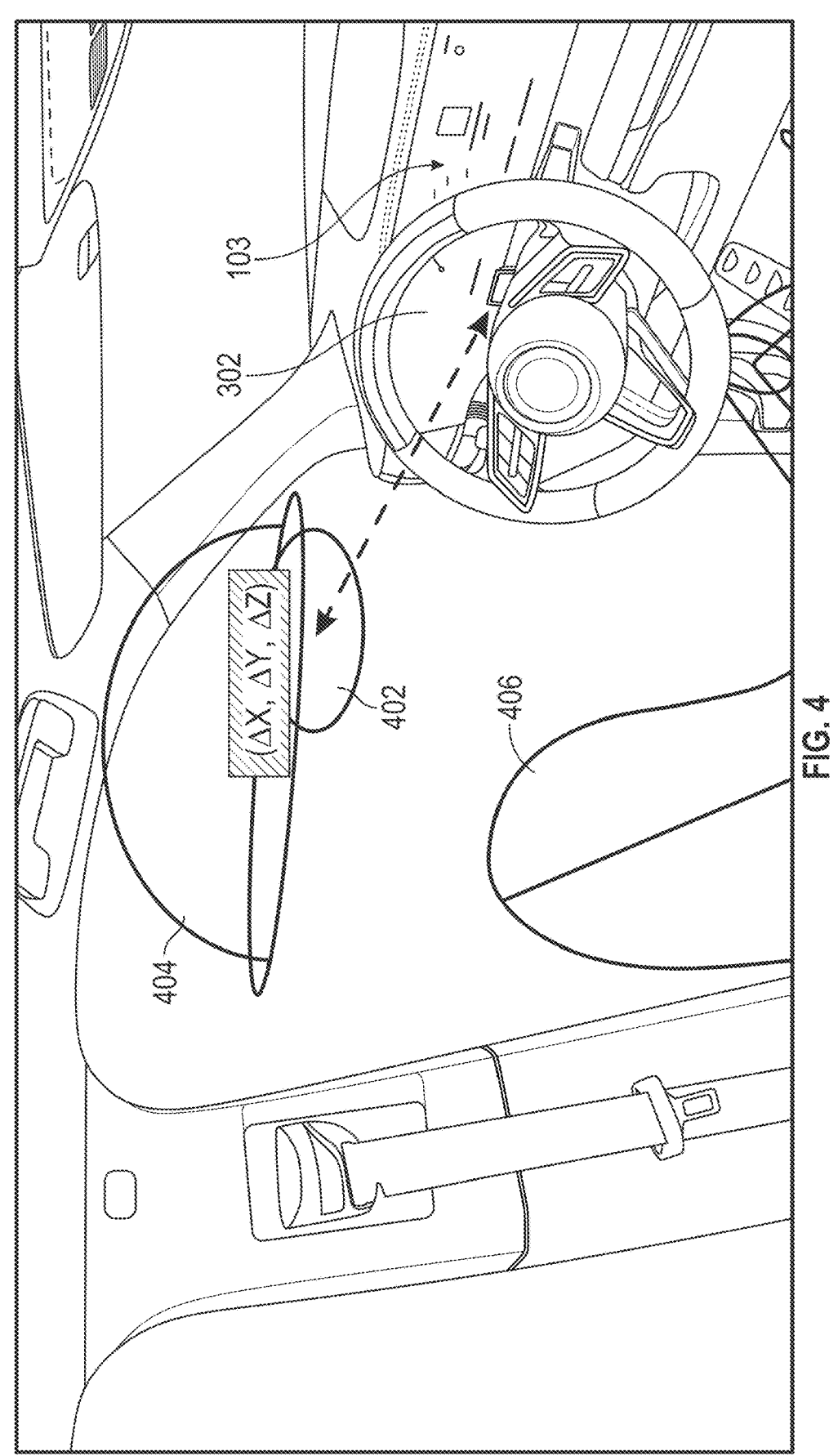

With reference to FIG. 4, an illustration 400 is provided with respect to the determination of the eyes (and/or head) of the driver of step 206 in accordance with an exemplary embodiment. Specifically, as depicted in the illustration 400 of FIG. 4, in an exemplary embodiment one or more cameras the DMS 302 are utilized to collect camera images of the seat 406 occupied by the driver, along with a head 404 of the driver, in order to obtain a three dimensional coordinate representation 402 (e.g., $\Delta X$, $\Delta Y$, $\Delta Z$) of the eyes (or, in certain embodiments, the head) of the driver that is utilized for an estimation of a line of sight between eyes of the driver and the display in combination with an estimated position of the steering wheel.

With reference back to FIG. 2, in various embodiments, a determination is made as to whether the driver's view of the display is obscured (step 208). In various embodiments, during step 208, the processor 142 utilizes the sensor data of step 202 and the determinations of steps 206 and 208 to determine whether the driver has an obscured view of the display 103 (e.g., of the vehicle's speed, fuel range, and/or other parameters that are depicted on a screen of the display 103 pertaining to the vehicle 100 and/or the operation thereof). For example, in certain embodiments, the determination of step 208 includes a determination as to whether a rim, a hub, or other component or portion of the steering wheel 105 obscures all or part of the screen of the display 103, including of a cluster's upper or lower border line, among other possible obstructions from the steering wheel 105 (e.g., such that the line of sight of the driver does not reach certain display images of information on the display).

In various embodiments, if it is determined in step 208 that an obstruction of the display based on the steering wheel is not present, then the display is unchanged (step 210). Specifically, in various embodiments, when the display is not obstructed, the processor 142 provides instructions for the display 103 to continue to display the display images with parameters and information in a current, or default, position, size, and manner of display.

Conversely, also in various embodiments, if it is instead determined in step 208 that an obstruction of the display based on the steering wheel is present, then machine learning database is utilized to determine one or more appropriate adjustments for the display images of the display (step 212). Specifically, in various embodiments, the sensor data and related determinations of steps 202-208 are utilized, along with a machine learning database (e.g., as stored among the stored values 157 in the memory 144 of the vehicle 100) in connection with a machine learning model, in order to determine one or more adjustments for the display of display images of information to the driver so that the display (or in certain embodiments, key parameters and/or other information displayed therein) are no longer obstructed, but rather can be readily viewed by the driver of the vehicle 100.

Figure 5:
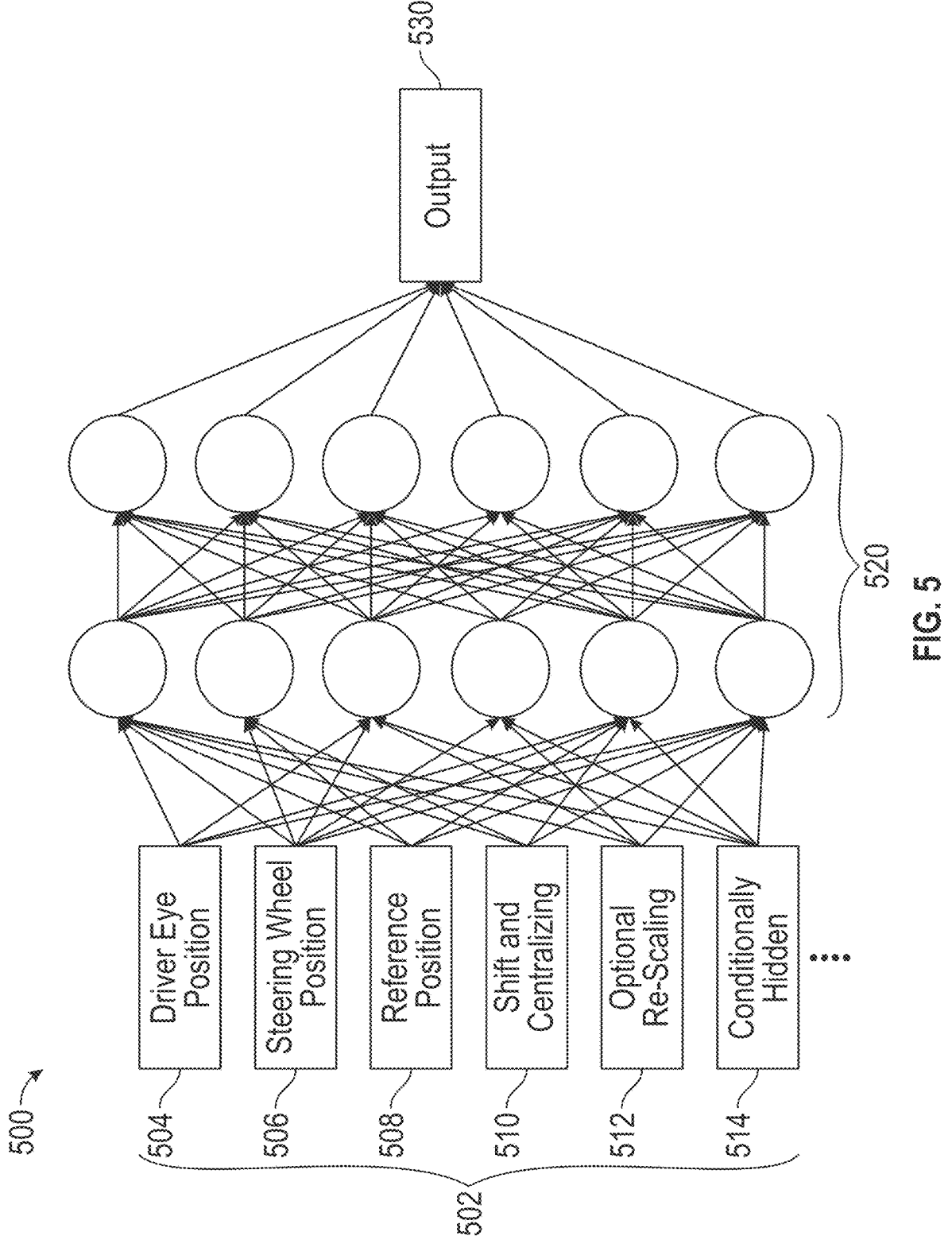
FIG. 5 is a depiction of a machine learning model that is utilized in an exemplary implementation of a portion of the process of FIG. 2, in accordance with exemplary embodiments.

With reference to FIG. 5, an exemplary machine learning model 500 is depicted, and that can be implemented in connection with step 208 of the process 200 of FIG. 2. As depicted in FIG. 5, in an exemplary embodiment, the machine learning model 500 includes a plurality of input layers 502, a plurality of hidden layers 520, and an output layer 530.

Also as depicted in FIG. 5, in an exemplary embodiment, the input layers 502 include a driver eye position 504, a steering wheel position 506, a reference position 508 (e.g., of the center of the airbag cover in certain embodiments); shift and centralization options 510; re-scaling options 512, and conditionally hidden options 514. In various embodiments, the driver eye position 504, the steering wheel position 506, and the reference position 508 are determined via the processor 142 based on the sensor data and determinations of steps 204-208. Also in various embodiments, the shift and centralization options 510, the re-scaling options 512, and the conditionally hidden options 514 represent potential manipulations of display images depicted on the display 103 that may alleviate the obstruction of the steering wheel 105 from the driver's view of the display 103.

Also as depicted in FIG. 5, in an exemplary embodiment, the hidden layers 520 include at least two additional layers for processing the input layers 502. In addition, in certain embodiments, the output 530 provides results of the potential manipulations, given the sensor data and other input layers 502, as to whether and to what extent the potential manipulations may be successful in alleviating or removing the obstruction of the steering wheel 105 from the driver's view of the display 103.

With reference back to FIG. 2, in an exemplary embodiment, shifting and centralizing of the data is performed (step 214). In various embodiments, during step 214, the processor 142 applies one of the potential manipulations of the display images for the information appearing on the display 103, namely shifting and centralization. Specifically, in various embodiments, the processor 142 performs a shifting of display images with information of interest (e.g., vehicle speed and other important information for the driver to see) along the display 103 into a region of the display 103 that is not obstructed from the driver's view by the steering wheel 105. In various embodiments, this also includes centralization of the display images with information of interest into a central or middle area of the portion of the display 103 that is not obstructed by the steering wheel 105 (e.g., in various embodiments, such that the line of sight from the driver's eyes to the display 103 is not obstructed by the steering wheel 105).

Also in an exemplary embodiment, a determination is made as to whether the obstruction is solved (step 216). In certain embodiments, during step 216, the processor 142 determines whether the shifting and centralization of step 214 effectively removes the obstruction, so that the driver can now successfully view the display 103 (and in particular, the information of interest therein).

In various embodiments, if it is determined in step 216 that the shifting and centralization of step 214 effectively removed the obstruction, then the shifting is maintained (step 218). Specifically, in various embodiments, during step 216, the processor 142 provides instructions that are implemented via the display 103 to provide the display images with information on the display that incorporates shifting and centralization of step 216.

Figures 6A, 6B, 7A, 7B:
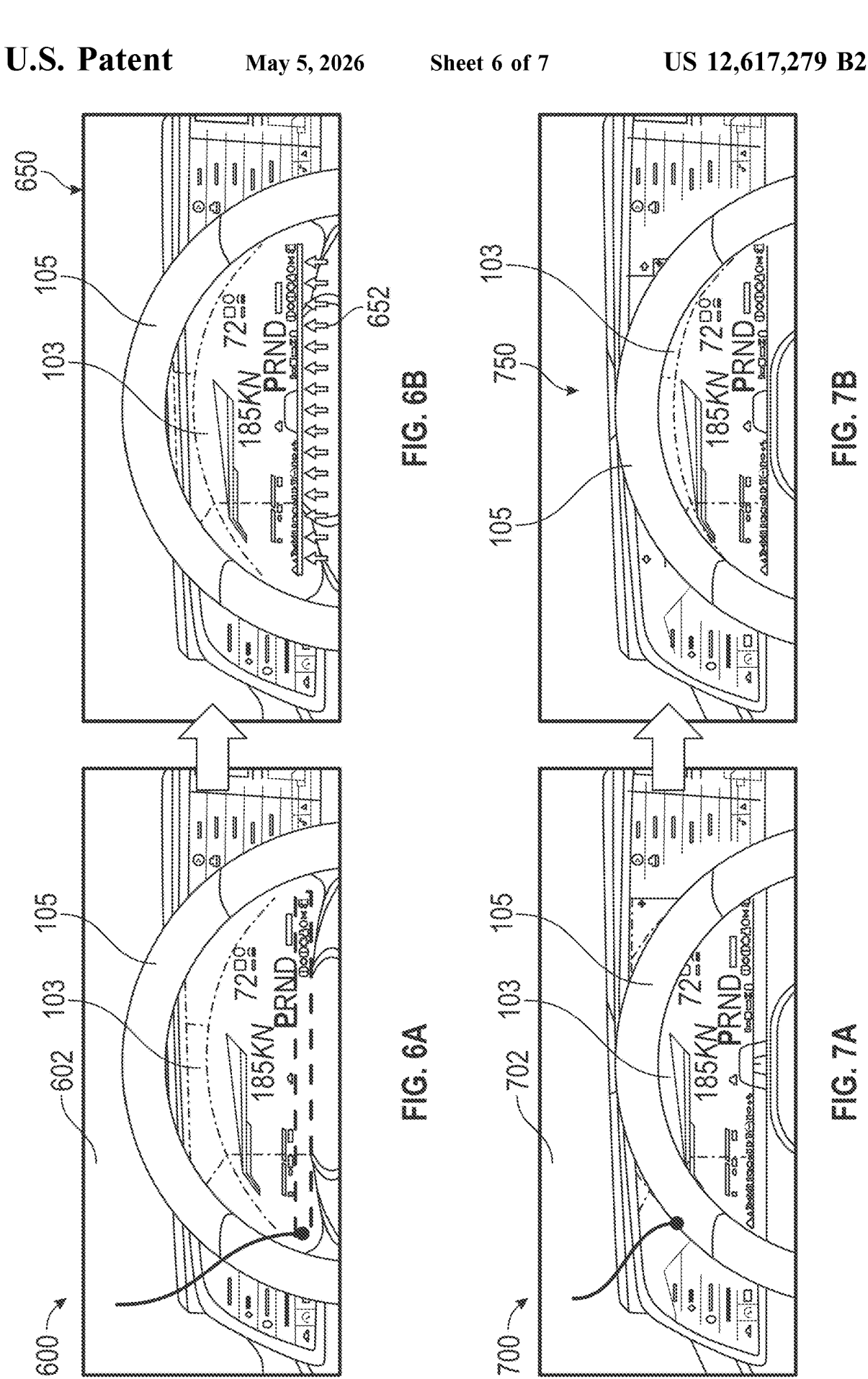
FIGS. 6A, 6B, 7A, 7B, and 8 depict exemplary vehicle displays as adjusted in accordance with the process of FIG. 2, in accordance with exemplary embodiments.

With reference to FIGS. 6A and 6B, illustrations 600 and 650, respectively, are provided with respect to the display of step 218, including the shifting and centralization of step 214, in accordance with an exemplary embodiment. Specifically, as depicted in an exemplary embodiment, a previously obstructed area 602 of a first illustration 600 of FIG. 6A is shifted upward into an updated region 652 as shown in second illustration 650 of FIG. 6B, that is not obstructed for the driver (e.g., such that the line of sight from the eyes of the driver to this region of the display 103 is not obstructed by the steering wheel 105).

With reference back to FIG. 2, if it is instead determined in step 216 that the shifting and centralization of step 214 did not effectively remove the obstruction, then in various embodiments the process 200 proceeds to step 220, described directly below.

In various embodiments, during step 220, a determination is made as to whether obstructed information of the display 130 (i.e., that is presently invisible or otherwise obstructed with respect to the driver) is related to regulatory versus program demands. In various embodiments, a regulatory demand would apply to information that is required to be visible to the driver by governmental and/or other regulatory authorities. Conversely, also in various embodiments, a program demand would apply to information that is useful for the driver to view, but that is not required by governmental and/or other regulatory authorities. In various embodiments, the determinations of step 220 are made by the processor 142 based on stored knowledge of regulatory and program requirements, for example as stored in the memory 144 of FIG. 1 as stored values therein.

In various embodiments, if a determination is made during step 220 that the obstructed information pertains to regulatory requirement, then the images are re-scaled by a first magnitude in the display 103 (step 222). Specifically, in various embodiments, during step 222, the processor 142 re-scales the display images with the obstructed information to a first re-scaled magnitude, so as to attempt to remove the obstruction while otherwise maintaining the image of the information to be as large as possible. In one exemplary embodiment, the first re-scaled magnitude comprises a new magnitude that is ninety percent (90%) of the original magnitude; however, this may vary in other embodiments.

Also in an exemplary embodiment, a determination is made as to whether the obstruction is solved (step 224). In certain embodiments, during step 224, the processor 142 determines whether the re-scaling of step 222 effectively removes the obstruction, so that the driver can now successfully view the information on the display 103.

In various embodiments, if it is determined in step 224 that the re-scaling of step 224 effectively removed the obstruction, then the re-scaling of step 222 is maintained (step 226). Specifically, in various embodiments, during step 216, the processor 142 provides instructions that are implemented via the display 103 to provide the display images and information as re-scaled in step 222.

With reference to FIGS. 7A and 7B, first and illustrations 700 and 750, respectively, are provided with respect to the display of step 226, including the re-scaling of step 222, in accordance with an exemplary embodiment. Specifically, as depicted in an exemplary embodiment, a previously a display image of an obstructed area 702 of the first illustration 700 of FIG. 7A is re-scaled as shown in the second illustration 750 of 7B, such that the display image is no longer obstructed for the driver (e.g., such that the line of sight from the eyes of the driver to this region of the display 103 is not obstructed by the steering wheel 105). For example, as shown in the second illustration 750 of FIG. 7B, the speed limit and other vehicle data is re-scaled so that it is no longer obstructed by the steering wheel 105.

With reference back to FIG. 2, if it is instead determined in step 224 that the re-scaling of step 222 did not effectively remove the obstruction, then in various embodiments the process 200 proceeds to step 228, described directly below.

In various embodiments, during step 228, the display images are re-scaled by a second magnitude in the display 103. Specifically, in various embodiments, during step 228, the processor 142 re-scales the obstructed information to a second re-scaled magnitude, so as to attempt to further remove the obstruction. In various embodiments, the second re-scaled magnitude of step 228 comprises a further reduction of the image size, so that the second-rescaled magnitude of step 228 is less than the first re-scaled magnitude of step 222. In one exemplary embodiment, the second re-scaled magnitude of step 228 comprises a new magnitude such that the display image and associated information fits inside the borderline of the portion of the display 103 that is visible to the driver (e.g., based on the line of sight from the driver's eyes to the display 103), but that otherwise maximizes the size of the image of the information that is visible to the driver. In various embodiments, the re-scaled display image of step 228 is provided to the driver via the display 103 based on instructions provided by the processor 142.

With reference back to step 220, if it is instead determined during step 220 that the obstructed information pertains to program requirement (and not a regulatory requirement), then the images are re-scaled by a third magnitude in the display 103 (step 230). Specifically, in various embodiments, during step 230, the processor 142 re-scales the obstructed information to a third re-scaled magnitude such that the display images are smaller than the first re-scaled magnitude of step 222. In one exemplary embodiment, the third re-scaled magnitude of step 232 comprises a new magnitude that is seventy percent (70%) of the original magnitude; however, this may vary in other embodiments.

Also in an exemplary embodiment, a determination is made as to whether the obstruction is solved (step 232). In certain embodiments, during step 232, the processor 142 determines whether the re-scaling of step 230 effectively removes the obstruction, so that the driver can now successfully view the information on the display 103.

In various embodiments, if it is determined in step 232 that the re-scaling of step 230 effectively removed the obstruction, then the re-scaling of step 230 is maintained (step 234). Specifically, in various embodiments, during step 234, the processor 142 provides instructions that are implemented via the display 103 to provide the information as re-scaled in step 230.

Conversely, if it is instead determined in step 232 that the re-scaling of step 230 did not effectively remove the obstruction, then in various embodiments the process 200 proceeds to step 236, described directly below.

In various embodiments, during step 236, the images are shifted and/or manipulated so that certain information that is deemed as relatively less important (compared with other relatively more important information). In various embodiments, this is performed via the display 103 based on instructions provided by the processor 142.

Figure 8:
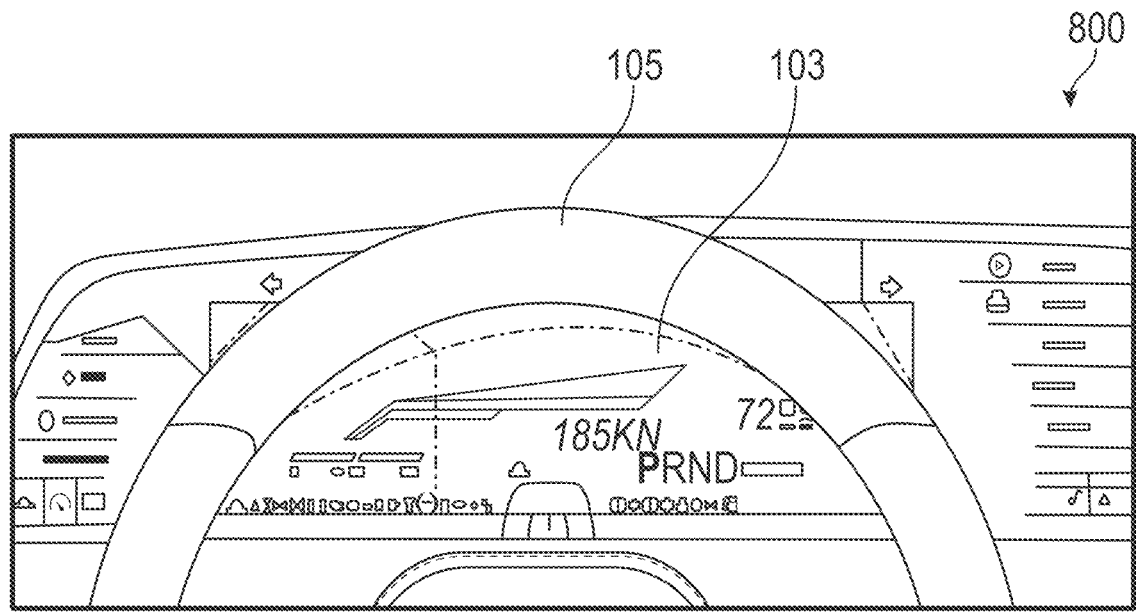

With reference to FIG. 8, illustration 800 is provided with respect to the display of step 236. Specifically, in accordance with an exemplary embodiment, certain information (that is deemed to be relatively less important) and associated display images may be hidden from the driver's view in the display 103, to help ensure that other information (such as the vehicle speed, that is deemed to be relatively more important) is clearly viewed by the driver on the display 103.

Accordingly, methods, systems, and vehicles are provided for controlling the display of a vehicle. In various embodiments, sensor data (including from driver monitoring cameras and/or steering wheel sensors, in various embodiments) are utilized to determine whether information in the display is obstructed by a steering wheel of the vehicle for viewing by a driver or other user of the vehicle. In various embodiments,. The images of the display are adjusted accordingly via instructions provided by a processor of the vehicle in order to remove the obstruction, so that the driver can clearly view the information of the display of the vehicle (including so that there is a clean line of sight from the eyes of the driver to the information on the display that is not obstructed by a steering wheel of the vehicle).

It will be appreciated that the systems, vehicles, and methods may vary from those depicted in the Figures and described herein. For example, the vehicle 100 of FIG. 1, the control system 102 and/or display 103 thereof, and/or components thereof of FIG. 1 may vary in different embodiments. It will similarly be appreciated that the steps of the process 200 may differ from that depicted in FIG. 2, and/or that various steps of the process 200 may occur concurrently and/or in a different order than that depicted in FIG. 2. It will similarly be appreciated that the implementations of FIGS. 3-5, 6A, 6B, 7A, 7B, and 8 may also differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining, via one or more sensors of a vehicle, including one or more cameras of the vehicle, sensor data pertaining to a steering wheel of the vehicle;

determining, via a processor of the vehicle using the sensor data in combination with a machine learning model stored in a non-transitory computer readable storage medium of the vehicle, whether a view of a display screen of a display system of the vehicle by a user of the vehicle is obstructed by the steering wheel, including based on a determination by the processor using the sensor data, including camera images from the one or more cameras, as to a position of a head of the user in addition to a current location of the steering wheel with respect to a reference point comprising an airbag cover on a pillar of the vehicle, and wherein the machine language model includes:

a plurality of input layers with values from the sensor data and from a machine language database, including driver eye position, steering wheel position, and reference position, along with shifting and centralizing, re-scaling, and conditionally hidden options;

a plurality of hidden layers for processing the plurality of input layers; and an output node that is generated from the plurality of hidden layers using each of the plurality of input layers, including the driver eye position, the steering wheel position, and the reference position, along with the shifting and centralizing, re-scaling, and conditionally hidden options;

adjusting, via instructions provided by the processor, one or more display images presented on the display screen, including by (a) selectively centering prioritized information, including a speed of the vehicle based on the sensor data, within a visible portion of the display screen that is not obstructed by the steering wheel, and further by (b) selectively hiding deprioritized information behind the steering wheel such that the user is able to see the prioritized information in a centered manner without seeing the deprioritized information, when it is determined that the view of the display screen by the user of the vehicle is obstructed by the steering wheel; and controlling, via instructions provided by the processor, braking of the vehicle via a braking system of the vehicle, steering of the vehicle via a steering system of the vehicle, or both, based on the one or more display images of the display screen as adjusted by the processor;

wherein:

a magnitude of the re-scaling is based on whether the one or more display images represent a regulatory requirement; and a portion of the one or more display images is conditionally hidden on the display based on whether the re-scaling was successful in alleviating obstruction by the steering wheel and further based on whether the one or more display images represent a regulatory requirement.

2. The method of claim 1, wherein the reference point comprises a center of the airbag cover on a B-pillar inside a cabin of the vehicle.

3. The method of claim 1, wherein the step of determining whether the view of the display is obstructed further is performed by the processor using a three dimensional coordinate representation of the camera images representing a head of a driver of the vehicle that is utilized for an estimation of a line of sight between eyes of the driver and the display in combination with an estimated position of the steering wheel.

4. The method of claim 1, wherein:

the step of obtaining the sensor data further comprises obtaining steering wheel position sensor data from one or more steering wheel position sensors of the vehicle; and the determining of whether the view of the display is obstructed is made by the processor based on the steering wheel position sensor data in addition to the camera images.

5. The method of claim 1, wherein the step of adjusting the one or more display images further comprises shifting, via the processor, the one or more display images to a different portion of the display screen that is not obstructed for the user by the steering wheel.

6. The method of claim 1, wherein the step of adjusting the one or more display images further comprises re-scaling, via the processor, the one or more display images to a different size so that the one or more display images are no longer obstructed for the user by the steering wheel.

7. The method of claim 1, wherein the machine language model includes:

a plurality of input layers with values from the sensor data and from a machine language database, including driver eye position, steering wheel position, and a reference position, along with shifting and centralizing, re-scaling, and conditionally hidden options;

a plurality of hidden layers for processing the plurality of input layers; and an output node that is generated from the plurality of hidden layers using each of the plurality of input layers, including the driver eye position, the steering wheel position, and the reference position, along with the shifting and centralizing, re-scaling, and conditionally hidden options.

8. The method of claim 1, wherein the step of adjusting the one or more display images further comprises re-scaling, via the processor, the one or more display images to a different size that is ninety percent of their original size, so that the one or more display images are no longer obstructed for the user by the steering wheel.

9. The method of claim 1, wherein the step of adjusting the one or more display images further comprises re-scaling, via the processor, the one or more display images to a different size that is seventy percent of their original size, so that the one or more display images are no longer obstructed for the user by the steering wheel.

10. The method of claim 1, wherein the controlling step comprises controlling, via instructions provided by the processor, the braking of the vehicle via the braking system of the vehicle based on the one or more display images of the display screen as adjusted by the processor.

11. The method of claim 1, wherein the controlling step comprises controlling, via instructions provided by the processor, the steering of the vehicle via the steering system of the vehicle based on the one or more display images of the display screen as adjusted by the processor.

12. The method of claim 1, wherein the controlling step comprises controlling, via instructions provided by the processor, both the braking of the vehicle via the braking system of the vehicle and the steering of the vehicle via the steering system of the vehicle based on the one or more display images of the display screen as adjusted by the processor.

13. A system comprising:

one or more sensors of a vehicle, the one or more sensors configured to obtain sensor data pertaining to a steering wheel of the vehicle;

a non-transitory computer readable storage medium of the vehicle, the non-transitory computer readable medium storing a machine learning model; and a processor that is coupled to the one or more sensors and to the non-transitory computer readable storage medium and that is configured to at least facilitate:

determining, using the sensor data in combination with a machine learning model stored in a non-transitory computer readable medium of the vehicle, whether a view of a display screen of a display system of the vehicle by a user of the vehicle is obstructed by the steering wheel, including based on a determination by the processor using the sensor data, including camera images from the one or more cameras, as to a position of a head of the user in addition to a current location of the steering wheel with respect to a reference point comprising an airbag cover on a pillar of the vehicle, and wherein the machine language model includes:

a plurality of input layers with values from the sensor data and from a machine language database, including driver eye position, steering wheel position, and reference position, along with shifting and centralizing, re-scaling, and conditionally hidden options;

a plurality of hidden layers for processing the plurality of input layers; and an output node that is generated from the plurality of hidden layers using each of the plurality of input layers, including the driver eye position, the steering wheel position, and the reference position, along with the shifting and centralizing, re-scaling, and conditionally hidden options;

adjusting, via instructions provided by the processor, one or more display images presented on the display screen, including by (a) selectively centering prioritized information, including a speed of the vehicle based on the sensor data, within a visible portion of the display screen that is not obstructed by the steering wheel, and further by (b) selectively hiding deprioritized information behind the steering wheel such that the user is able to see the prioritized information in a centered manner without seeing the deprioritized information, when it is determined that the view of the display screen by the user of the vehicle is obstructed by the steering wheel; and controlling, via instructions provided by the processor, braking of the vehicle via a braking system of the vehicle, steering of the vehicle via a steering system of the vehicle, or both, based on the one or more display images of the display screen as adjusted by the processor;

wherein:

a magnitude of the re-scaling is based on whether the one or more display images represent a regulatory requirement; and a portion of the one or more display images is conditionally hidden on the display based on whether the re-scaling was successful in alleviating obstruction by the steering wheel and further based on whether the one or more display images represent a regulatory requirement.

14. The system of claim 13, wherein the processor is further configured to at least facilitate determining whether the view of the display is obstructed using a three dimensional coordinate representation of the camera images representing a head of a driver of the vehicle that is utilized for an estimation of a line of sight between eyes of the driver and the display in combination with an estimated position of the steering wheel.

15. The system of claim 13, wherein:

the one or more sensors further comprise one or more steering wheel position sensors of the vehicle that are configured to obtain steering wheel position sensor data; and the processor is further configured to at least facilitate determining whether the view of the display screen is obstructed using the steering wheel position sensor data in addition to the camera images.

16. The system of claim 13, wherein the processor is further configured to at least facilitate adjusting the one or more display images by shifting the one or more display images to a different portion of the display screen that is not obstructed for the user by the steering wheel.

17. The system of claim 13, wherein the processor is further configured to at least facilitate adjusting the one or more display images by re-scaling the one or more display images to a different size so that the one or more display images are no longer obstructed for the user by the steering wheel.

18. A vehicle comprising:

a body;

a drive system configured to move the body;

a steering wheel;

a display system having a display screen;

one or more sensors configured to obtain sensor data pertaining to the steering wheel;

a non-transitory computer readable storage medium of the vehicle, the non-transitory computer readable medium storing a machine learning model; and a processor that is coupled to the one or more sensors and to the non-transitory computer readable storage medium and that is configured to at least facilitate:

determining, using the sensor data in combination with a machine learning model stored in a non-transitory computer readable medium of the vehicle, whether a view of the display screen by a user of the vehicle is obstructed by the steering wheel, including based on a determination by the processor using the sensor data, including camera images from the one or more cameras, as to a position of a head of the user in addition to a current location of the steering wheel with respect to a reference point comprising an airbag cover on a pillar of the vehicle, and wherein the machine language model includes:

a plurality of input layers with values from the sensor data and from a machine language database, including driver eye position, steering wheel position, and reference position, along with shifting and centralizing, re-scaling, and conditionally hidden options;

a plurality of hidden layers for processing the plurality of input layers; and an output node that is generated from the plurality of hidden layers using each of the plurality of input layers, including the driver eye position, the steering wheel position, and the reference position, along with the shifting and centralizing, re-scaling, and conditionally hidden options;

adjusting, via instructions provided by the processor, one or more display images presented on the display screen, including by (a) selectively centering prioritized information, including a speed of the vehicle based on the sensor data, within a visible portion of the display screen that is not obstructed by the steering wheel, and further by (b) selectively hiding deprioritized information behind the steering wheel such that the user is able to see the prioritized information in a centered manner without seeing the deprioritized information, when it is determined that the view of the display screen by the user of the vehicle is obstructed by the steering wheel; and controlling, via instructions provided by the processor, braking of the vehicle via a braking system of the vehicle, steering of the vehicle via a steering system of the vehicle, or both, based on the one or more display images of the display screen as adjusted by the processor;

wherein:

a magnitude of the re-scaling is based on whether the one or more display images represent a regulatory requirement; and a portion of the one or more display images is conditionally hidden on the display based on whether the re-scaling was successful in alleviating obstruction by the steering wheel and further based on whether the one or more display images represent a regulatory requirement.

* * * * *